US012521259B2

(12) United States Patent
Fulkerson et al.

(10) Patent No.: US 12,521,259 B2
(45) Date of Patent: Jan. 13, 2026

(54) STENTS HAVING PROTRUDING FEATURES FOR ANCHORING

(71) Applicant: ReFlow Medical, Inc., San Clemente, CA (US)

(72) Inventors: John Fulkerson, Rancho Santa Margarita, CA (US); Isa Rizk, San Diego, CA (US); Jihad Ali Mustapha, Ada, MI (US); Teodoro S. Jimenez, Jr., Aliso Viejo, CA (US)

(73) Assignee: ReFlow Medical, Inc., San Clemente, CA (US)

( * ) Notice: Subject to any disclaimer, the term of this patent is extended or adjusted under 35 U.S.C. 154(b) by 922 days.

(21) Appl. No.: 17/089,482

(22) Filed: Nov. 4, 2020

(65) Prior Publication Data

US 2021/0128330 A1    May 6, 2021

Related U.S. Application Data

(60) Provisional application No. 62/930,461, filed on Nov. 4, 2019.

(51) Int. Cl.
| A61F 2/90 | (2013.01) |
| A61F 2/848 | (2013.01) |
| A61F 2/958 | (2013.01) |
| A61F 2/82 | (2013.01) |

(52) U.S. Cl.
CPC ............... *A61F 2/90* (2013.01); *A61F 2/958* (2013.01); *A61F 2002/825* (2013.01); *A61F 2/848* (2013.01); *A61F 2002/8483* (2013.01); *A61F 2220/0016* (2013.01); *A61F 2250/0037* (2013.01); *A61F 2250/0039* (2013.01)

(58) Field of Classification Search
None
See application file for complete search history.

(56) References Cited

U.S. PATENT DOCUMENTS

| 9,486,336 B2 | 11/2016 | Quadri | |
| 2001/0047180 A1* | 11/2001 | Grudem | A61B 17/11 |
| | | | 606/153 |
| 2007/0038288 A1* | 2/2007 | Lye | A61F 2/07 |
| | | | 623/1.36 |
| 2007/0179590 A1 | 8/2007 | Lu et al. | |

(Continued)

FOREIGN PATENT DOCUMENTS

| CN | 104487127 A | 4/2015 |
| CN | 108366866 A | 8/2018 |

(Continued)

OTHER PUBLICATIONS

International Search Report and Written Opinion from PCT/US2020/058925, dated Mar. 15, 2021, 19 pages.

(Continued)

*Primary Examiner* — Leslie A Lopez
(74) *Attorney, Agent, or Firm* — BAKERHOSTETLER (57) ABSTRACT

A stent can include outwardly facing protruding features that facilitate engagement with a wall of a body vessel. The protruding features can deploy from a frame of the stent to extend radially outwardly. When deployed into a body vessel, the protruding features engage and anchor against the wall of the body vessel to ensure accurate and secure placement of the stent.

14 Claims, 4 Drawing Sheets

(56) References Cited

U.S. PATENT DOCUMENTS

| | | |
|---|---|---|
| 2009/0270972 A1 | 10/2009 | Lane |
| 2010/0204549 A1 | 8/2010 | Surti |
| 2011/0054492 A1* | 3/2011 | Clark ................. A61B 17/0057 |
| | | 606/151 |
| 2011/0054503 A1 | 3/2011 | Rizk et al. |
| 2013/0035750 A1 | 2/2013 | Rizk et al. |
| 2014/0277340 A1* | 9/2014 | White ....................... A61F 2/07 |
| | | 623/1.11 |
| 2014/0343671 A1 | 11/2014 | Yohanan et al. |
| 2015/0209063 A1 | 7/2015 | Rizk et al. |
| 2016/0038280 A1* | 2/2016 | Morriss ................ A61F 2/2436 |
| | | 623/2.18 |
| 2016/0081799 A1* | 3/2016 | Leo ...................... A61F 2/2418 |
| | | 623/2.11 |
| 2016/0206334 A1 | 7/2016 | Rizk et al. |
| 2017/0100266 A1* | 4/2017 | Fulkerson ............... A61L 31/16 |
| 2017/0196717 A1 | 7/2017 | Fulkerson et al. |
| 2018/0092732 A1* | 4/2018 | Kringle ..................... A61F 2/04 |
| 2018/0289517 A1 | 10/2018 | Jimenez et al. |
| 2019/0053922 A1 | 2/2019 | Howard et al. |
| 2019/0201219 A1 | 7/2019 | Fulkerson et al. |
| 2020/0107947 A1 | 4/2020 | Jimenez, Jr. et al. |

FOREIGN PATENT DOCUMENTS

| | | |
|---|---|---|
| EP | 0843538 B1 | 6/2002 |
| JP | H 10-510445 | 10/1998 |
| JP | 2017-533806 | 11/2017 |
| JP | 2018-531135 | 10/2018 |
| JP | 2018-196748 | 12/2018 |
| JP | 2019-506251 | 3/2019 |

OTHER PUBLICATIONS

Chinese Office Action from Chinese Patent Application No. 202080091625.7, dated Jul. 9, 2024, 20 pages including English language translation.

Japanese Office Action from Japanese Patent Application No. 2022-525167, dated Jul. 3, 2024, 6 pages including English language translation.

Canadian Office Action from Canadian Patent Application No. 3152969, dated Apr. 24, 2024, 4 pages.

Chinese Office Action from Chinese Patent Application No. 202080091625.7, dated Jan. 10, 2025, 16 pages including English language translation.

Japanese Patent Application No. 2022-525167, Decision to Grant dated Jun. 17, 2025, 4 pages with machine generated language translation.

Chinese Patent Application No. 202080091625.7, Office Action dated Apr. 28, 2025, 15 pages including English language translation.

Australian Patent Application No. 2020379750; Examination Report dated Sep. 25, 2025, 4 pages.

Chinese Patent Application No. 202080091625.7, Notice of Allowance dated Sep. 16, 2025, 2025, 9 pages including English language translation.

* cited by examiner

STENTS HAVING PROTRUDING FEATURES FOR ANCHORING

CROSS-REFERENCE TO RELATED APPLICATION

This application claims the benefit of U.S. Provisional Application No. 62/930,461, entitled "STENTS HAVING PROTRUDING FEATURES FOR ANCHORING," filed Nov. 4, 2019, the entirety of which is incorporated herein by reference.

TECHNICAL FIELD

The present description relates generally to treatment of body vessels with stents. In particular, described herein are devices and methods for anchoring stents within body vessels.

BACKGROUND

Stents and related endoluminal devices are used by medical practitioners to treat portions of the vascular system that have become weakened or that have become so narrowed that blood flow is restricted (commonly referred to as "stenosis"). In the venous system, a stent can be used to treat stenosis within the vessel. Venous stenosis may be caused by clotting, scarring following blood clots or by focal external compressive forces on a venous vessel (such as in the femoral vein where it crosses the inguinal ligament or in the pelvic vein where it is crossed by overlaying pelvic arteries). Stents in the venous system are most often used to "prop open" blood vessels as well as treat May-Thurner syndrome or other deep venous thrombosis (DVT). More generally, stents can be used to reinforce collapsed or narrowed tubular structures in other regions body, such as the respiratory system, the reproductive system, or any other tubular body structure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Many stents are designed to work in fairly small lumens and are relatively short in length. However, lumens in the venous system can be much larger than coronary and peripheral arteries and the desired stent length can be long in comparison to arterial stents. Furthermore, the blood vessels (e.g., veins) in the venous system, in contrast to the blood vessels (e.g., arteries) in the arterial system, generally increase in size as they extend downstream in the direction of blood flow. Conventional stent design is often inadequate to properly address these conditions, as the conventional stent structure is typically formed with cylindrical frames having axially constant diameters and constant expansive forces along their lengths. Long length stent structures may also encounter variations (e.g., increases) in lumen size over the venous application length, making placement and use of a single sized cross-sectional sized stent problematic. In some stent systems, compressive/expansive forces on one modular section tend to shorten or lengthen the particular section, allowing for relative movement between adjacent modular stent sections. Such movement is not desirable, particularly where proper stent placement is critical to accommodate intersecting veins.

The following disclosure describes various embodiments of devices, systems, and methods for employing expandable structures, such as stents or scaffolds, having spikes, flails, or other protruding features for anchoring a stent within a body vessel of a human patient. The delivery systems can be configured to deliver and position expandable structures within a body lumen (e.g., vessel). In addition, these delivery systems can also be configured to deploy and expand the expandable structures in the body lumen. The expandable structures can be configured to be securely anchored in a fixed location within the body vessel. Optionally, the expandable structures can be removed by a controlled operation.

In particular, the present disclosure provides stents having outwardly facing protruding features that facilitate engagement and anchoring against a wall of a blood vessel. Such anchoring can ensure secure placement of the stent by resisting adjustments and migration thereof that might otherwise result from forces incident on the stent, including blood flow and shifting of the blood vessel. By anchoring the stent with the protruding features, the need for the frame and other portions of the stent to provide anchoring is reduced. As such, such other portions of the stent can be designed to provide other characteristics that are desirable for any given application, such as venous stenting. Such characteristics can include high flexibility, high radial forces, high compression resistance, large diameter, and long length.

Certain details are set forth in the following description and FIGS. 1-6 to provide a thorough understanding of various embodiments of the disclosure. To avoid unnecessarily obscuring the description of the various embodiments of the disclosure, other details describing well-known structures and systems often associated with expandable structures, protruding features, and the components or devices associated with the manufacture of such structures are not set forth below. Moreover, many of the details and features shown in the figures are merely illustrative of particular embodiments of the disclosure. Accordingly, other embodiments can have other details and features without departing from the spirit and scope of the present disclosure. A person of ordinary skill in the relevant art will therefore understand that the present technology, which includes associated devices, systems, and procedures, may include other embodiments with additional elements or steps, and/or may include other embodiments without several of the features or steps shown and described below with reference to FIGS. 1-6. Furthermore, various embodiments of the disclosure can include structures other than those illustrated in the figures and are expressly not limited to the structures shown in the figures.

As shown in FIGS. 1-4, an expandable stent 100 is provided with a frame 110 and multiple outwardly extending protruding features 120. The frame 110 can be configured to radially outwardly expand after the stent 100 has been unsheathed from a delivery shaft. The protruding features 120 can be configured to radially outwardly expand from the frame 110 as the stent 100 is unsheathed from the delivery shaft and/or as the frame 110 expands radially outwardly.

The stent 100 can be self-expanding upon release from a constraint. Additionally or alternatively, the stent 100 can be expandable by radial forces applied from a balloon that is inflated while within the stent 100. The frame 110 can include multiple struts 112 arranged in a pattern that supports compression, expansion, flexibility, and bendability of the stent 100. The struts 112 can be connected to each other to form openings 108 that extend through the frame 110, such as from a lumen within the frame 110 to an exterior of the frame 110. In some embodiments, the frame 110 forms an outermost extent of the stent 100. For example, the stent 100 can omit a graft material or other covering, thereby leaving the openings 108 exposed to adjacent structures. Alternatively, the stent 100 can be combined with other structures, such as graft materials or other coverings extending along at least a portion of a length thereof. The frame 110 can form a generally cylindrical shape along at least a portion of the stent 100. At least a portion of each protruding feature 120 can extend at least partially outwardly from the frame 110 (e.g., towards a distal or proximal end of the stent 100). For example, at least a portion of each protruding feature 120 can extend parallel to a longitudinal axis of the stent 100. At least a portion (e.g., terminal end portion) of each protruding feature 120 can extend at least partially radially outwardly from the frame 110. By further example, at least a portion of each protruding feature 120 can extend distally and/or proximally from the frame 110.

Where at least a portion of each protruding feature 120 extends distally from the frame 110, the protruding features 120 can be readily retracted into a delivery device by folding down and extending distally when the delivery device is advanced from a proximal side of the stent 100 in a distal direction over the stent 100. The protruding features 194 can optionally include drugs for delivery to a target delivery location upon expansion of the stent 100. However, it will be understood that a stent 100 can omit drugs for delivery and treat a target delivery location by penetrating tissue with the protruding features 120.

The frame 110, struts 112, and/or protruding features 120 can be composed of or formed from a variety materials including, e.g., nitinol, cobalt chromium, stainless steel, any of a variety of other metals or metal alloys, or a combination thereof. The frame 110, struts 112, and/or protruding features 120 may also be composed of or formed from bioresorbable biodegradable, nanoporous or non-bioresorbable, non-biodegradable, non-nanopourous materials including, e.g., one or more polymers, nitinol, plastic materials, etc., or a combination thereof. In some embodiments, the frame 110 and the struts 112 can be formed from a bioresorbable material and the protruding features 120 can be formed from a non-bioresorbable material, such as nitinol. In these embodiments, the protruding features 120 can remain engaged with or penetrating a portion of the body lumen after the expanded frame 110 and struts 112 bio-resorb. After the expanded frame 110 and struts 112 bio-resorb, the body lumen where the stent 100 had been expanded is no longer partially occluded by the frame 110 and the struts 112 allowing for larger volumes of fluids, such as aqueous pharmaceutical compositions, to pass through the body lumen and contact the luminal wall. The protruding features 120 may also be formed of a bio-resorbable material and, once the stent 100 has bio-resorbed, the spaces in the body lumen wall vacated by the protruding features 120 can be contacted by the fluids passing through the body lumen. In this way, the stent 100 can increase a surface area of the body lumen wall contacted by the fluid.

The protruding features 120 may also be carried by more than one strut 112, the frame 110, or a combination thereof. The protruding features 120 may be integrally and/or monolithically formed with the frame (e.g., the struts 112), for example by bending or twisting a portion of one or more struts and/or the frame 110 toward a longitudinal axis of the stent 100 or, alternatively, the protruding features 120 may be separate, discrete components that are attached to desired locations along the struts 112 and/or the frame 110.

The protruding features 120 can include one or more of a variety of shapes and features. For example, the protruding features 120, or portions thereof, can be straight, curved, helical, and/or spiral. The protruding features 120 can have the same or different sizes, shapes, and/or features relative to each other.

The protruding features 120 can be contained within an outer periphery of the frame 110 while the stent 100 is in a collapsed configuration and/or when the stent 100 is in an expanded configuration. For example, the protruding features 120 can be positioned within the openings 108 between multiple struts 112. Each of the protruding features 120 can move to extend at least partially away from a central axis 190 of the stent 100.

Figure 1:
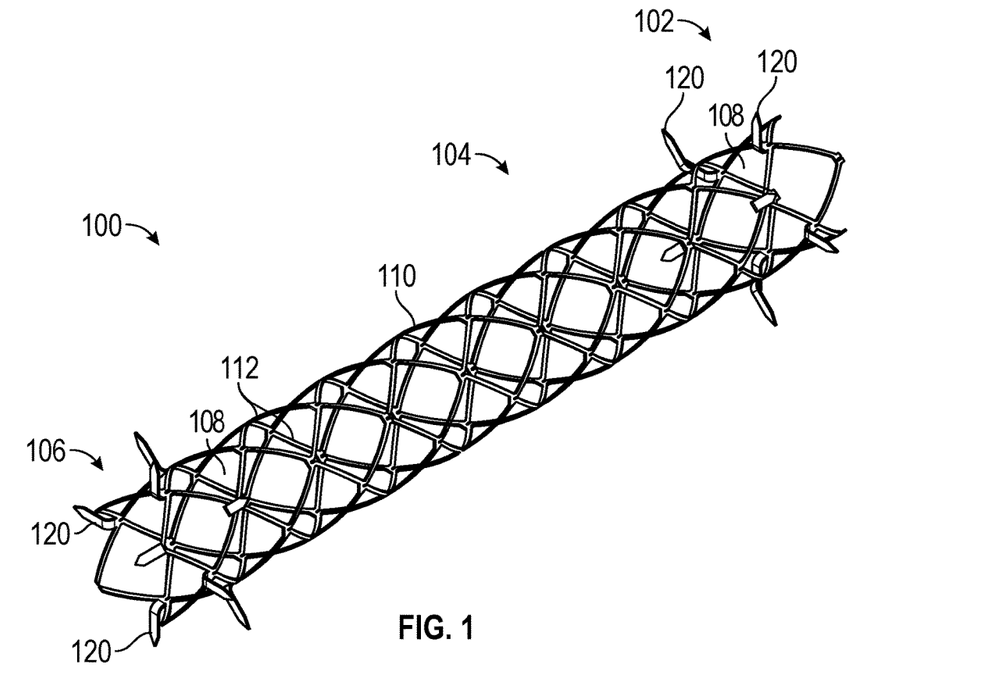
FIG. 1 shows a perspective view of an example of a stent, according to some embodiments of the present disclosure.
Figure 2:
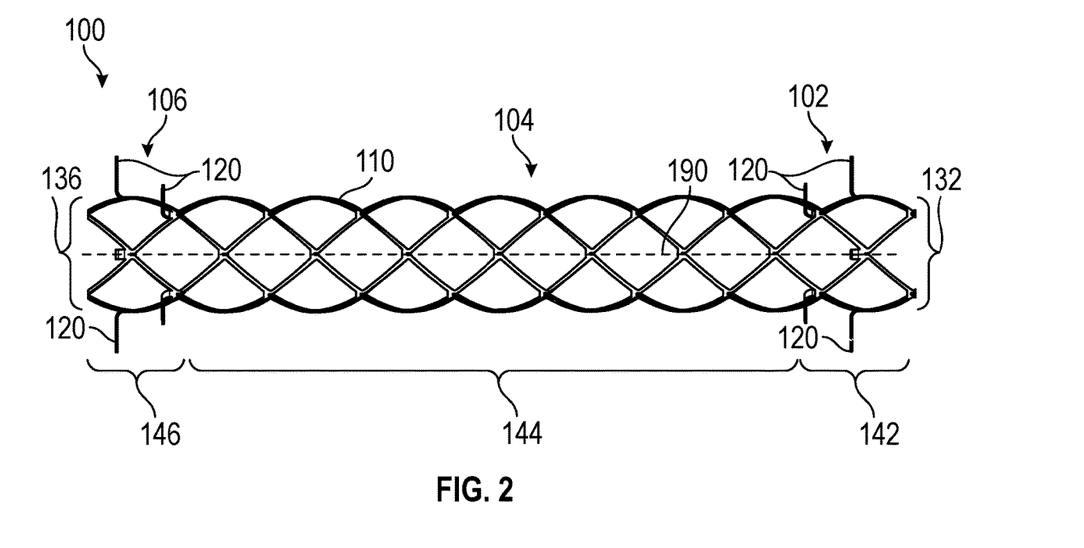
FIG. 2 shows a side view of the stent of FIG. 1, according to some embodiments of the present disclosure.
Figure 3:
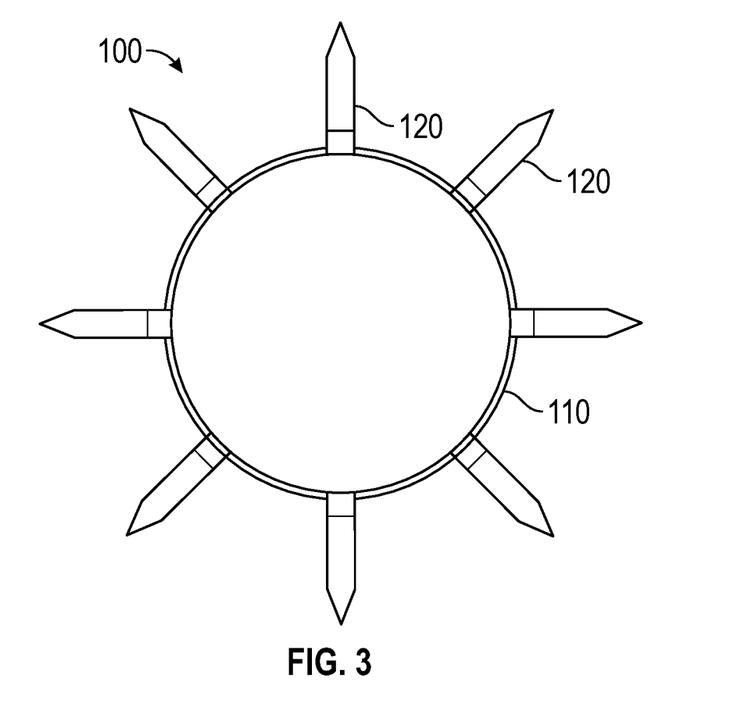
FIG. 3 shows a front view of the stent of FIG. 1, according to some embodiments of the present disclosure.

The protruding features 120 can be localized and/or grouped together within discrete portions along a length of the frame 110. As shown in FIGS. 1 and 2, the stent 100 can include a proximal section 102 at or defining a proximal end portion of the stent 100 and a distal section 106 at or defining a distal end portion of the stent 100. The stent 100 can further include a middle section 104 between the proximal section 102 and the distal section 106. The proximal section 102 and the distal section 106 can include a number of protruding features 120 extending from the frame 110. In contrast, the middle section 104 can omit protruding features, such that the radially outermost extent of the stent along the middle section 104 is defined by the frame 110. Accordingly, the protruding features 120 at the proximal section 102 and the distal section 106 can provide anchoring for the stent 100 at the end thereof, while the middle section 104 can remain relatively more free to move, flex, bend, and/or stretch.

Each of the sections can be defined by whether or not they provide protruding features. For example, the frame 110 can include a proximal section 102, a middle section 104, and a distal section 106. The middle section 104 (e.g., without protruding features) can extend a substantial proportion of the total length of the frame 110 and/or the stent 100. For example, a middle section length 144 defined by the middle section 104 of the frame 110 can extend at least 10%, 20%, 30%, 40%, 50%, 60%, 70%, 80%, or 90% of the total length of the frame 110 and/or the stent 100. By further example, the middle section length 144 can be greater than each of a proximal section length 142 of the proximal section 102 of the frame 110 and a distal section length 146 of the distal section 106 of the frame 110. By further example, the middle section length 144 can be greater than a combined length of the proximal section length 142 and the distal section length 146. The pattern(s) and/or shape(s) formed by the frame 110 can be the same across the proximal section 102, the middle section 104, and the distal section 106. As such, the presence or absence of protruding features 120 can optionally be the only distinction between the proximal section 102, the middle section 104, and/or the distal section 106. It will be understood that any number of sections can be provided. For example, 1, 2, 3, 4, 5, 6, or more than 6 sections having protruding features 120 can be provided. Each axially adjacent pair of such sections can optionally be separated by a section having no protruding features 120.

The protruding features 120 can have the same or different axial positions, circumferential positions, and/or orientations (e.g., proximal or distal facing). For example, at least some of the protruding features 120 can be axially aligned and arranged with different circumferential positions and/or orientations. By further example, at least some of the protruding features 120 can be circumferentially aligned and arranged with different axial positions and/or orientations. By further example, at least some of the protruding features 120 can have the same orientation and be arranged with different axial and/or circumferential positions. At least some of the protruding features 120 can have different axial and circumferential positions. At least some of the protruding features 120 can have different axial positions and orientations. At least some of the protruding features 120 can have different circumferential positions and orientations.

As shown in FIGS. 1 and 2, the protruding features 120 of the proximal section 102 and the distal section 106 can have one or more features in common. For example, at least some of the protruding features 120 of the proximal section 102 and the distal section 106 can have the same orientations, with portions thereof extending in the same or similar directions. By further example, portions of each protruding feature 120 can extend toward either a distal or proximal end of the stent 100. Such a configuration can provide consistent anchoring against forces and/or migration in a given direction (e.g., downstream in a blood vessel). Alternatively, the protruding features 120 can extend in different (e.g., opposing) directions to provide anchoring against forces and/or migration in each of different directions.

The stent 100 can vary its size along a length thereof. For example, the proximal section 102 (upstream) of the stent 100 can have a proximal cross-sectional dimension (e.g. diameter) 132 that is smaller than a distal cross-sectional dimension (e.g. diameter) 136 of the distal section 106 of the frame 110 of the stent 100. This can facilitate better vessel wall engagement by matching the generally enlarging vessel size in a downstream direction. The cross-sectional dimension (e.g. diameter) of the stent 100 can gradually taper from one end to an opposite end thereof. Additionally or alternatively, the stent 100 can provide flared end portions at each of opposing ends thereof. The stent 100 can provide variable radially outward forces along different longitudinal segments thereof. For example, the end sections of the stent 100 can provide higher radial forces than a middle section thereof. Yet other (higher and/or lower) force profiles can be provided along different longitudinal sections of the stent 100.

In some embodiments, the stent 100 can include a material (e.g., PTFE, Dacron, polyamides, such as nylon and/or polyurethane based materials, silicone, etc.) positioned over, for example, struts of the frame 110. In some embodiments, the material covers the entire outer surface area of the frame 110. In some embodiments, the material covers an outer surface area of the frame 110 along only the middle section 104 between the proximal section 102 and the distal section 106. The material can be a mesh or a braid. In some embodiments, the material can further be configured to allow blood flow through the inner lumen of the stent 100 and/or limit blood flow to an outer dimension of the stent 100. In addition, the material can be configured to prevent debris from the wall of the body lumen from entering the bloodstream.

Figure 4:
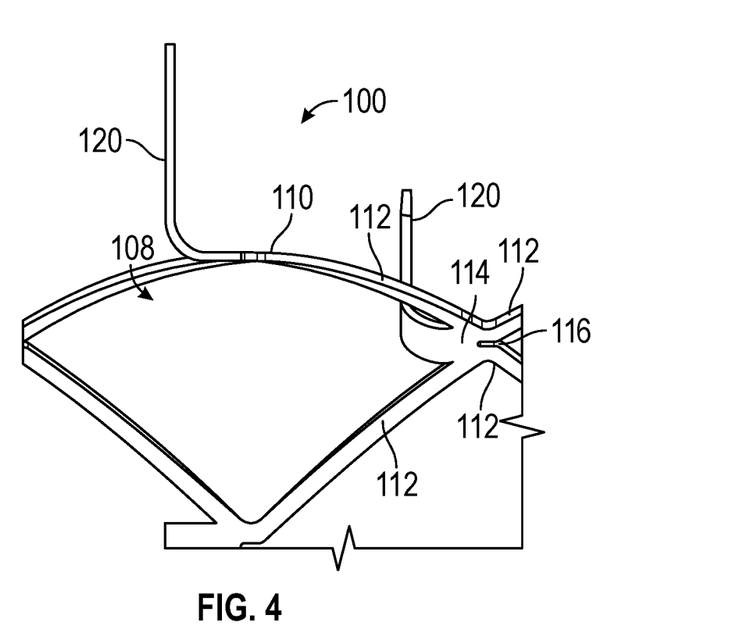
FIG. 4 shows an enlarged sectional view of a portion of the stent of FIG. 1, according to some embodiments of the present disclosure.

As shown in FIG. 4, the protruding features 120, or portions thereof, can form an angle as they extend radially outwardly from the frame 110. The angle can be any angle (e.g., from 0 to 90 degrees). The angle can be selected during formation so that the angle is formed when the stent 100 expands when deployed. The angle can be equal to, less than, and/or greater than 0, 10, 20, 30, 40, 50, 60, 70, 80, or 90 degrees. The angle can be the same or different for any two protruding features 120.

As shown in FIG. 4, the struts 112 can be connected to each other and arranged, such that multiple struts 112 (e.g., 2, 3, 4, 5, 6, 7, 8, or more than 8 struts) are connected together at a vertex 114. The protruding features 120 can each extend from a corresponding vertex 114. For example, the protruding features 120 can extend from a vertex 114 at an end of an opening 108. As such, the protruding features 120 can have only one end connected to the frame 110.

The frame 110 can form gaps 116 at the vertices 114 to facilitate collapse and expansion of the frame 110. For example, the struts 112 can be allowed to move toward and away from each other to facilitate transition of the frame 110. Such movement can be enhanced by providing gaps 116, as shown in FIG. 4. The gaps 116, for example, can be positioned on a side of the vertex 114 that is opposite the corresponding protruding feature 120 that extends from the vertex 114. In some examples, the gaps 116 can extend longitudinally with parallel edges, although other shapes are contemplated. Accordingly, the frame 110 can provide ample flexibility for transitioning between the collapsed and expanded configurations.

Figure 5:
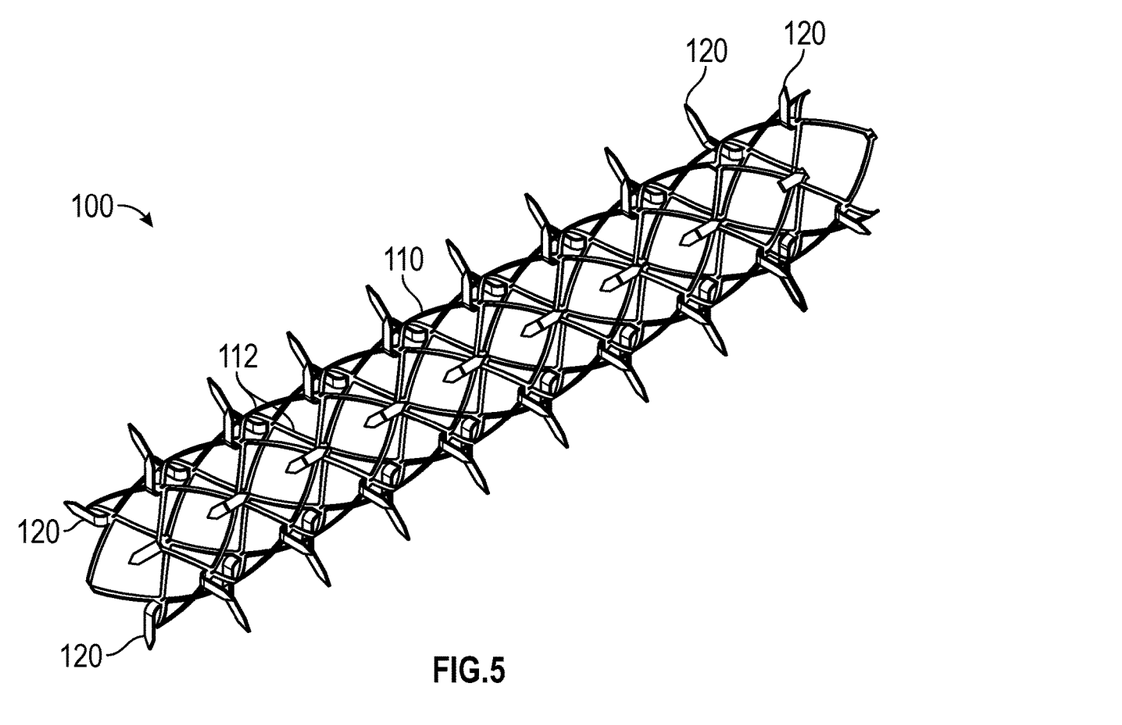
FIG. 5 shows a perspective view of an example of a stent, according to some embodiments of the present disclosure.
Figure 6:
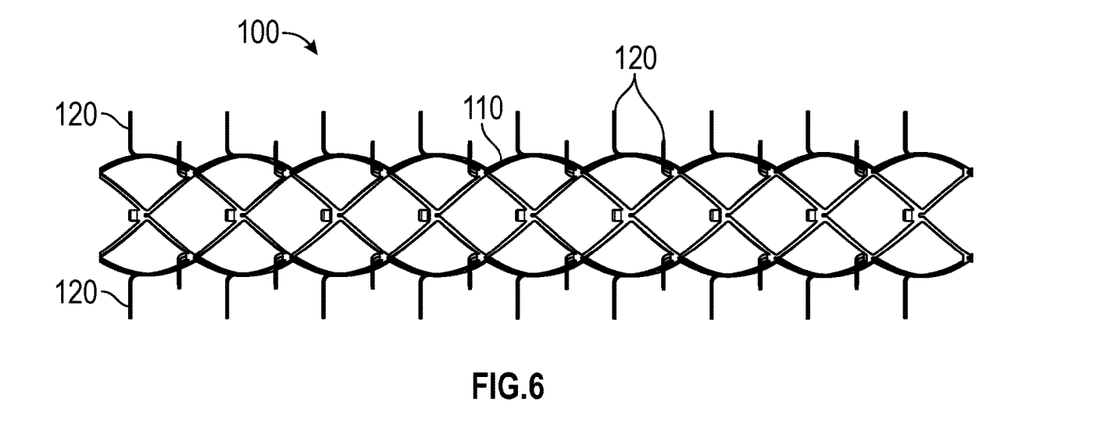
FIG. 6 shows a side view of the stent of FIG. 5, according to some embodiments of the present disclosure.

FIGS. 5 and 6 illustrate a modified expandable stent 100 having several features in common with the stent 100 illustrated in FIGS. 1-4. Accordingly, common features are designated with the same numbering as used in FIGS. 1-4, and the description above will be understood to apply to the stent 100 of FIGS. 5 and 6.

As shown in FIGS. 5 and 6, the stent 100 can include protruding features 120 that are evenly distributed along a length thereof, including along middle sections thereof. As discussed above, the protruding features 120 can have the same, similar, and/or different features with respect to one another.

While the stents described herein have the features shown, it will be understood that a variety of different stents and other devices can be used with the delivery systems described herein. Various features are set forth below by way of example, and not by limitation.

Regarding such stents and other devices, the material(s) for forming the frame 110, struts 112, and/or protruding features 120 described herein can be selected based on mechanical and/or thermal properties, such as strength, ductility, hardness, elasticity, flexibility, flexural modulus, flexural strength, plasticity, stiffness, emissivity, thermal conductivity, specific heat, thermal diffusivity, thermal expansion, any of a variety of other properties, or a combination thereof. If formed from a material having thermal properties, the material can be activated to deliver thermal treatment to the desired treatment site. Regardless of the material, the frame 110, struts 112, and/or protruding features 120 can be formed from a tube or a wire, such as a solid wire, by laser cutting or other suitable techniques. When formed from the wire, a portion of the wire can be removed by chemical etching or another suitable method to create an inner dimension of the stent.

The stent 100 (e.g., the frame 110 and the struts 112) can be sized and shaped for positioning within various body lumens, including blood vessels, while not rupturing the vessel. For example, several stents and other structures can have radial strength without causing dissection or damage thereto. Vessels in which the stents described herein may be sized and shaped for placement include arteries, such as coronary arteries, peripheral arteries, carotid arteries, circle of willis, anterior cerebral artery, middle cerebral artery, posterior cerebral artery, any of the lenticulostriate arteries, renal arteries, femoral arteries, veins, such as cerebral veins, saphenous veins, arteriovenous fistulas, or any other vessel that may contain a treatment site. The stent 100 can have a variety of shapes, including a cube, a rectangular prism, a cylinder, a cone, a pyramid, or variations thereof.

The stent 100 having protruding features 120 can include a variety of dimensions (in both the low-profile delivery state and expanded deployed state). These embodiments can provide for expansion that enables usage in a variety of situations covering a wide range of dimensions, such as to treat and/or prevent dissection. Regardless of the shape, stents can have a length of about 10 mm, about 20 mm, about 30 mm, about 40 mm, about 50 mm, about 60 mm, about 70 mm, about 80 mm, about 90 mm, about 100 mm, about 110 mm, about 120 mm, about 130 mm, about 140 mm, about 150 mm, about 160 mm, about 170 mm, about 180 mm, about 190 mm, about 200 mm, about 210 mm, about 220 mm, about 230 mm, about 240 mm, or about 250 mm. In addition, a stent shaped into a cube, a rectangular prism, or a pyramid can have a width of about 0.25 mm, about 0.5 mm, about 1 mm, about 2 mm, about 3 mm, about 4 mm, about 5 mm, about 6 mm, about 7 mm, about 8 mm, about 9 mm, about 10 mm, about 12 mm, about 14 mm, about 16 mm, about 18 mm, about 20 mm, about 25 mm, or about 30 mm. Moreover, a stent shaped into a cylinder or a cone can have a cross-sectional dimension (e.g. diameter) of about 0.25 mm, about 0.5 mm, about 1 mm, about 2 mm, about 3 mm, about 4 mm, about 5 mm, about 6 mm, about 7 mm, about 8 mm, about 9 mm, about 10 mm, about 12 mm, about 14 mm, about 16 mm, about 18 mm, about 20 mm, about 25 mm, about 30 mm, about 35 mm, about 40 mm, or about 50 mm. The cross-sectional dimension (e.g. diameter) of the stent 100 can decrementally decrease along a length of the stent 100. In addition, the stent 100 can be sized and shaped to prepare the body lumen for certain procedures, such as a stent positioning procedure.

The stent 100 and/or other expandable structures in the expanded state can have a cross-sectional dimension of about 2 mm to about 10 mm. For example, the frame 110 can have a cross-sectional dimension of about 1 mm to about 9 mm and the protruding features 120 can each have a length from about 0.1 mm to about 4.5 mm. In some embodiments, the stent 100 has an overall cross-sectional dimension of about 4 mm with the frame 110 having a cross-sectional dimension of about 2 mm and the protruding features 120 each having a length of about 1 mm. In some embodiments, the stent 100 has an overall cross-sectional dimension of about 6 mm with the frame 110 having a cross-sectional dimension of about 4 mm and the protruding features 120 each having a length of about 1.5 mm. In further embodiments, the protruding features 120 can have a plurality of lengths such that the length of the protruding features 120 of a stent or other expandable structure differs. For example, a stent can include protruding features 120 having a length of about 0.2 mm, about 0.5 mm, about 1.0 mm, about 1.5 mm, about 2.0 mm, about 2.5 mm, about 3.0 mm, about 3.5 mm, about 4.0 mm, about 4.5 mm, and/or about 5.0 mm.

Profiles of the stent 100 can be sized such that the stent 100 are compatible with a wide range of catheter sizes. Embodiments in accordance with the present technology can include stents or other structures designed to receive a guidewire, such as guidewires having a diameter of 0.010, 0.014, 0.018, 0.035, or 0.038 inch. In several embodiments, the stent 100 can be sized and designed for delivery via a micro-catheter that it is pushed through. In some embodiments, the stent 100 can be incorporated into a delivery system, including modular or single unit delivery systems.

The stent 100 can include a marking for visualization of the stent 100 within the body lumen, such as one or more radiopaque markers. The radiopaque markers can be formed from Clearfil Photo Core PLT®, tantalum, titanium, tungsten, barium sulfate, and zirconium oxide, or another suitable radiopaque marking. The markings can be formed on a proximal portion of the stent 100, a distal portion, an intermediate portion, or a combination thereof. The markings can be a band, a coil, a clip, filled into one or more portions of a tube in the stent 100, plated onto one or more portions of the stent 100, or a combination thereof. Regardless of the type of marking, the marking can be coined, swaged, wrapped, or encased along, or onto any portion of the stent 100.

The stent 100 can be flexible enough to track through various anatomical features, including those having a curvature. The flexible properties of the stent 100 can be provided by the material from they are formed. In addition, flexible properties can also be provided by fracturing one or more of the members engaging with and extending between two or more rows of struts 112. Additionally, the stent 100 can be readily deployed and expanded, and retracted and contracted. The stent 100 can also be readily repositioned within a vessel or other body lumen.

In some embodiments, a drug-eluting compound is coated onto at least a portion of the protruding features 120, the frame 110, and/or the struts 112. The coating can be any suitable coating known to one of ordinary skill in the art suitable to deliver the drug. For example, suitable coatings include, but are not limited to a snow coating or a crystalline coating having edges configured to remain in the wall. The drug-eluting compound can be a synthetic or biological polymer coated into a variety of different patterns and thicknesses suitable for delivering the drug contained therein. In some embodiments, the protruding features 120 themselves may be composed of drug-eluting materials. The drug carried by the drug-eluting compound and/or the protruding features 120 in accordance with the present technology can be any drug suitable for treating the treatment site in which the stent 100 will be placed and may or may not include an excipient. For example, the drug can be an anti-proliferative, an anti-neoplastic, a migration inhibitor, an enhanced healing factor, an immunosuppressive, an anti-thrombotic, a blood thinner, or a radioactive compound. In some embodiments, the drug-eluting compound and/or the protruding features 120 can carry more than one drug.

In some embodiments, the protruding features 120 can include textured (e.g., ribbed) surfaces which is expected to provide greater surface area for drug-delivery. Moreover, any protruding features 120 can include a textured surface such as a ribbed surface (vertical, horizontal, radial, or circular relative to a longitudinal plane of the protruding feature), a cross-hatched surface, an isotropic surface, or other surface types suitable for providing greater surface area for vessel anchoring.

The protruding features can be sized and shaped to engage with and/or penetrate an occlusion, a neointima, an intima, an internal elastic lamina (IEL) a media, an external elastic lamina (EEL), an adventitia, or a combination thereof. The protruding features can also be sized and shaped to engage with and/or penetrate a tissue and/or structure adjacent to the body lumen in which the stent is to be placed while not rupturing the body lumen. For example, the stent can include square protruding features sized and configured to penetrate into the intima and/or the media of a body lumen, pointed protruding features sized and configured to penetrate and extend into the media, and/or the IEL. In addition, protruding features can be configured to bend in one or more directions relative to a longitudinal axis of the stent to engage with and/or penetrate a portion of the body lumen described herein. In several embodiments, the protruding features can penetrate deeper into the wall of a diseased body lumen, such as a vessel, compared to a stent lacking protruding features. In addition, the stent can allow for blood to flow even while in the expanded position.

Further, it will be appreciated that stent 100 can carry one or more protruding features 120 on one or more portions of the stent 100. For example, the stent 100 can carry about 5 protruding features, about 10 protruding features, about 15 protruding features, about 20 protruding features, about 30 protruding features, about 40 protruding features, about 50 protruding features, about 60 protruding features, about 70 protruding features, about 80 protruding features, about 90 protruding features, or about 100 protruding features. The protruding features 120 can be carried by the frame 110, the struts 112, or a combination thereof. The number of protruding features 120 can vary depending upon, for example, the target treatment site and/or the size of the stent 100, etc. In addition, the protruding features 120 carried by the stent 100 can be different types of the protruding features 120 disclosed herein.

The embodiments described herein provide delivery systems for one or more structures having a means for delivering drugs to a specific region within a body lumen, such as the vasculature, while still allowing fluid (e.g., blood) to flow through the treatment area where the structure has been placed and/or other devices or treatment means within the adjacent body lumen. In some embodiments, the fluid is temporary prevented from flowing through the treatment area while one or more regions of systems is delivered, deployed, positioned, and/or removed from the body lumen. In addition, the delivery systems can be configured to prepare the body lumen for treatment, by raking the stent, pulling the stent, turning the stent, or a combination thereof, proximal or distal to the treatment site. In some embodiments, the delivery systems can be configured to rotate the stent when mechanical force is applied.

Referring now to FIGS. 7-10, methods described herein provide delivery of the stent 100 to a target delivery location by operation of a delivery device 90 of a delivery system 10. While methods in their various stages are discussed and illustrated herein, it will be understood that multiple variations of each method are also contemplated. For example, the methods can be performed in various orders of operations, with additional operations, or with fewer operations.

Figure 7:
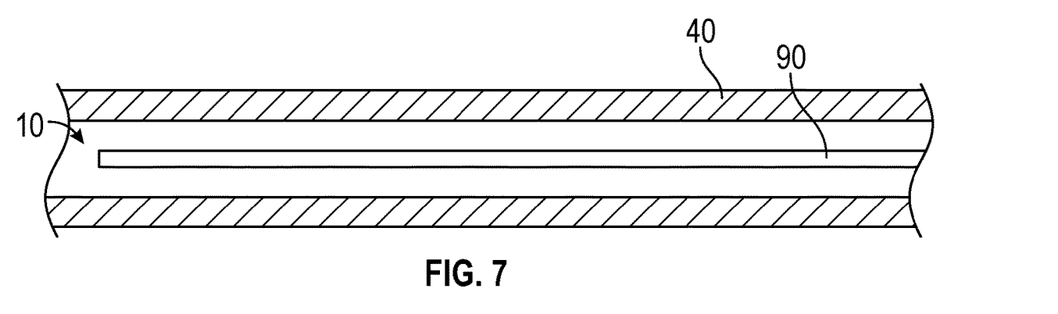
FIG. 7 shows a first stage of an example of a method for treating a body vessel with a stent, according to some embodiments of the present disclosure.

As shown in FIG. 7, a delivery device 90 can be brought to a location within a blood vessel 40 containing a target location for treatment. The location can include a stenosis or other feature that is to be ameliorated by placement of a stent and/or other procedures. The delivery device 90 can be positioned upstream or downstream from the target location. The delivery device 90 can be positioned while a stent is contained therein. Alternatively, the delivery device 90 can be positioned and the stent can be advanced within the delivery device 90 at a later stage. The delivery device 90 can be positioned with the assistance of a guide wire and/or one or more other devices.

Figure 8:
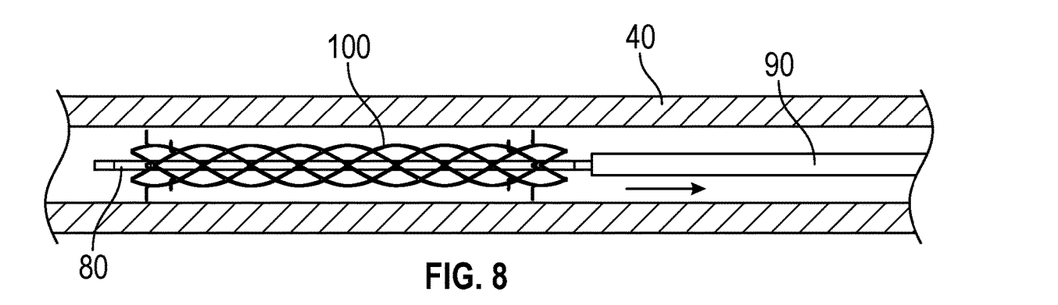
FIG. 8 shows a second stage of the method for treating the body vessel with the stent, according to some embodiments of the present disclosure.

As shown in FIG. 8, the delivery device 90 can be retracted proximally while the stent 100 is maintained in a given position. Alternatively, the delivery device 90 can be held in place while the stent 100 is pushed distally out of the delivery device 90. As the delivery device 90 unsheathes the stent 100, the stent 100 can radially expand. Such expansion can include expansion of the frame and/or the protruding features. In the expanded configuration, the frame and/or the protruding features can engage the walls of the blood vessel 40. As further shown in FIG. 8, an inflatable device 80 can optionally be provided with the stent 100 (e.g., with the stent 100 mounted thereon) or advanced to the location of the stent 100. The stent 100 can be secured temporarily to the inflatable device 80 and/or another element of the delivery system 10 (e.g., control shaft extending within and/or along the delivery device 90). For example, the stent 100 can be positioned with the inflatable device 80 and/or with another element, for example independently of the inflatable device 80. Where the stent 100 is positionable separate from and/or simultaneous with the inflatable device 80, the user can be provided with a mechanical connection to the stent 100 to facilitate positioning thereof. The connection can facilitate positioning and repositioning of the stent 100 as needed before, during, and/or after expansion of the stent 100 and/or the inflatable device 80. Such a connection can be temporary and/or severable, for example with mechanical, electrolytic, chemical, thermal, and/or other detachment mechanisms between the stent 100 and the inflatable device 80 and/or another element. Following detachment from the inflatable device 80 and/or another element, the stent 100 can maintain its position (e.g., anchored) and remain independent of the inflatable device 80 and/or another element.

Figure 9:
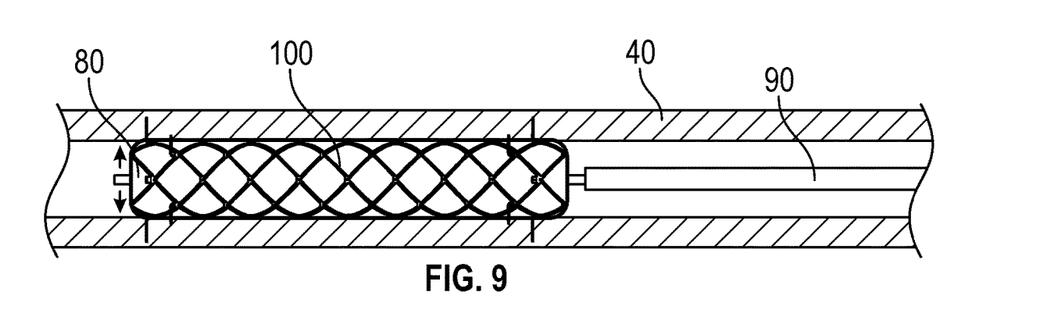
FIG. 9 shows a third stage of the method for treating the body vessel with the stent, according to some embodiments of the present disclosure.

As shown in FIG. 9, the inflatable device 80 can be inflated or otherwise expanded to urge the stent 100 to radially expand and engage or further engage the wall of the blood vessel 40. For example, the inflatable device 80 can drive the protruding features into or further into the wall of the blood vessel 40. It will be understood that the provision and/or use of an inflatable device 80 can be optional, such as where the stent 100 provides sufficient self-expansion characteristics to engage the wall of the blood vessel 40. Where applicable, the stent 100 can be repositioned as needed after expansion of the stent 100 and/or the inflatable device 80. Where a mechanical connection to the stent 100 is at least temporarily maintained, the stent 100 can be adjusted as needed. Detachment of the stent 100 from any such mechanical connection can be performed before, during, and/or after expansion of the stent 100 and/or the inflatable device 80. Following detachment, the stent 100 can be securely anchored to the blood vessel 40. Optionally, additional operations can be performed to adjust and/or remove the stent 100 following detachment and/or expansion thereof.

Figure 10:
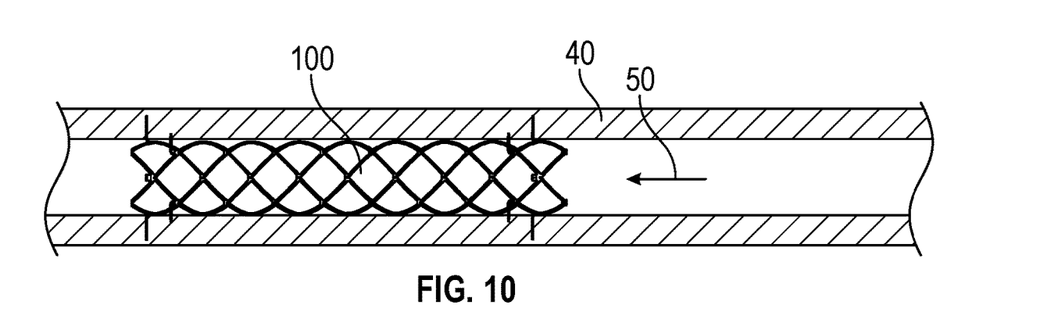
FIG. 10 shows a fourth stage of the method for treating the body vessel with the stent, according to some embodiments of the present disclosure.

As shown in FIG. 10, the inflatable device 80 and the delivery device 90 can be removed from the blood vessel 40 while the stent 100 remains in place. Blood can be allowed to flow through a lumen defined by the stent 100. The stent 100 can provide sufficient engagement with the wall of the blood vessel 40 to resist migration from the target location despite the flow 50 and shifting of the blood vessel 40.

Optionally, the stent 100 can be removed from the blood vessel 40. For example, the stent 100 can remain attached and/or integral with a positioner (not shown). The positioner can optionally extend at least partially through the delivery device 90. After any duration of time, the stent 100 can be positioned within and/or removed from the blood vessel. Where the stent 100 is separate or separated from (e.g., by detachment) a positioner, the stent 100 can be retrieved by another device, such as a grasping device.

Accordingly, the present disclosure provides stents having outwardly facing protruding features that facilitate engagement and anchoring against a wall of a blood vessel. By anchoring the stent with the protruding features, the need for the frame and other portions of the stent to provide anchoring is reduced. As such, such other portions of the stent can be designed to provide other characteristics that are desirable for any given application, such as venous stenting. Such characteristics can include high flexibility, high radial forces, high compression resistance, large diameter, and long length.

Various examples of aspects of the disclosure are described below as clauses for convenience. These are provided as examples, and do not limit the subject technology.

Clause A: a stent comprising: a frame comprising struts and configured to expand from a collapsed configuration to an expanded configuration, the frame forming: a proximal section; a distal section; and a middle section between the proximal section and the distal section; protruding features extending radially outwardly from the frame when the frame is in the expanded configuration, the protruding features being connected to only the proximal section and the distal section of the frame.

Clause B: a delivery system comprising: an inflatable device; a stent extending about the inflatable device, the stent comprising: a frame comprising struts and configured to expand from a collapsed configuration to an expanded configuration, the frame forming a proximal section, a distal section, and a middle section between the proximal section and the distal section; protruding features extending radially outwardly from the proximal section and the distal section of the frame when the frame is in the expanded configuration; and a delivery device containing the inflatable device and the stent.

Clause C: a method comprising: positioning a delivery system within a body vessel, the delivery system comprising a delivery device containing a stent in a collapsed configuration while within a lumen of the delivery device; expanding the stent outside of the delivery device until protruding features of the stent penetrate walls of the body vessel, the protruding features extending radially outwardly from a proximal section and a distal section of a frame of the stent, the proximal section and the distal section being joined by a middle section of the frame that abuts the body vessel without penetrating the body vessel; and removing the delivery device from the body vessel.

One or more of the above clauses can include one or more of the features described below. It is noted that any of the following clauses may be combined in any combination with each other, and placed into a respective independent clause, e.g., clause A, B, or C.

Clause 1: the middle section is longer than each of the proximal section and the distal section.

Clause 2: a cross-sectional dimension of the distal section is larger than a cross-sectional dimension of the proximal section.

Clause 3: the proximal section and the distal section are configured to apply radially outward forces on a body vessel, and the middle section is configured to apply radially outward force on the body vessel, the radially outward force applied by the middle section being less than the radially outward forces applied by the proximal section and the distal section.

Clause 4: each of the protruding features extend from the frame in a same longitudinal direction, the protruding features further extending radially outwardly away from the frame.

Clause 5: the struts are arranged such that multiple ones of the struts are connected to each other to form a vertex, wherein one of the protruding features extends from the vertex.

Clause 6: the struts form a gap on a side of the vertex that is opposite the one of the protruding features.

Clause 7: in the collapsed configuration, the protruding features extend longitudinally within openings formed between the struts; and in the expanded configuration, the protruding features extend radially outwardly.

Clause 8: the protruding features are monolithically formed with the frame.

Clause 9: the inflatable device extends across the proximal section and the distal section of the frame.

Clause 10: in the collapsed configuration, the protruding features extend longitudinally within openings formed between the struts; and in the expanded configuration, the protruding features extend radially outwardly.

Clause 11: the expanding comprises: positioning an inflatable device within the stent; expanding the inflatable device against the stent until the protruding features penetrate the body vessel.

Clause 12: the distal section is positioned within the body vessel downstream of the proximal section.

Clause 13: the proximal section and the distal section of the frame apply radially outward forces against the body vessel that are greater than a radially outward force applied by the middle section against the body vessel.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A stent comprising:
   a frame comprising struts and configured to expand from a collapsed configuration to an expanded configuration, wherein the struts are connected to each other to form vertices, the frame forming:
   a proximal section;
   a distal section, wherein, in the expanded configuration, a cross-sectional dimension of the distal section of the frame is larger than a cross-sectional dimension of the proximal section of the frame; and
   a middle section between the proximal section and the distal section, wherein the middle section is longer than each of the proximal section and the distal section; and
   protruding features each extending distally from a distal side of a corresponding one of the vertices and radially outwardly from the frame when the frame is in the expanded configuration, the protruding features being connected to only the proximal section and the distal section of the frame, wherein the struts form gaps that allow the struts to move toward and away from each other to facilitate transition between the collapsed configuration and the expanded configuration, each of the gaps being on a proximal side of the corresponding one of the vertices and longitudinally opposite a corresponding one of the protruding features, each of the gaps being defined by parallel edges of the struts on opposing sides of a corresponding one of the gaps.

2. The stent of claim 1, wherein the proximal section and the distal section are configured to apply radially outward forces on a body vessel, and the middle section is configured to apply radially outward force on the body vessel, the radially outward force applied by the middle section being less than the radially outward forces applied by the proximal section and the distal section.

3. The stent of claim 1, wherein each of the protruding features extend from the frame in a same longitudinal direction, the protruding features further extending radially outwardly away from the frame.

4. The stent of claim 1, wherein:
in the collapsed configuration, the protruding features extend longitudinally within openings formed between the struts; and
in the expanded configuration, the protruding features extend radially outwardly.

5. The stent of claim 1, wherein the protruding features are monolithically formed with the frame.

6. A delivery system comprising:
an inflatable device;
a stent extending about the inflatable device, the stent comprising:
a frame comprising struts and configured to expand from a collapsed configuration to an expanded configuration, wherein the struts are connected to each other to form vertices, the frame forming a proximal section, a distal section, and a middle section between the proximal section and the distal section, wherein the middle section is longer than each of the proximal section and the distal section, wherein, in the expanded configuration, a cross-sectional dimension of the distal section of the frame is larger than a cross-sectional dimension of the proximal section of the frame; and
protruding features each extending distally from a distal side of a corresponding one of the vertices and radially outwardly from the proximal section and the distal section of the frame when the frame is in the expanded configuration, the protruding features being connected to only the proximal section and the distal section of the frame, wherein the struts form gaps that allow the struts to move toward and away from each other to facilitate transition between the collapsed configuration and the expanded configuration, each of the gaps being on a proximal side of the corresponding one of the vertices and longitudinally opposite a corresponding one of the protruding features, each of the gaps being defined by parallel edges of the struts on opposing sides of a corresponding one of the gaps; and
a delivery device containing the inflatable device and the stent.

7. The delivery system of claim 6, wherein the inflatable device extends across the proximal section and the distal section of the frame.

8. The delivery system of claim 6, wherein:
in the collapsed configuration, the protruding features extend longitudinally within openings formed between the struts; and
in the expanded configuration, the protruding features extend radially outwardly.

9. The delivery system of claim 6, wherein the protruding features are monolithically formed with the frame.

10. The delivery system of claim 6, wherein the middle section is longer than each of the proximal section and the distal section.

11. A method comprising:
positioning a delivery system within a body vessel, the delivery system comprising a delivery device containing a stent in a collapsed configuration while within a lumen of the delivery device, the stent comprising:
a frame comprising struts and configured to expand from the collapsed configuration to an expanded configuration, wherein the struts are connected to each other to form vertices, the frame forming:
a proximal section;
a distal section, wherein, in the expanded configuration, a cross-sectional dimension of the distal section of the frame is larger than a cross-sectional dimension of the proximal section of the frame; and
a middle section between the proximal section and the distal section, wherein the middle section is longer than each of the proximal section and the distal section; and
protruding features each extending distally from a distal side of a corresponding one of the vertices and radially outwardly from the frame when the frame is in the expanded configuration, wherein the struts form gaps that allow the struts to move toward and away from each other to facilitate transition between the collapsed configuration and the expanded configuration, each of the gaps being on a proximal side of the corresponding one of the vertices and longitudinally opposite a corresponding one of the protruding features, each of the gaps being defined by parallel edges of the struts on opposing sides of a corresponding one of the gaps;
expanding the stent outside of the delivery device until the protruding features of the stent penetrate walls of the body vessel, the protruding features extending radially outwardly from only the proximal section and the distal section, the proximal section and the distal section being joined by the middle section of the frame that abuts the body vessel without penetrating the body vessel; and
removing the delivery device from the body vessel.

12. The method of claim 11, wherein the expanding comprises:
positioning an inflatable device within the stent;
expanding the inflatable device against the stent until the protruding features penetrate the body vessel.

13. The method of claim 11, wherein the distal section is positioned within the body vessel downstream of the proximal section.

14. The method of claim 11, wherein the proximal section and the distal section of the frame apply radially outward forces against the body vessel that are greater than a radially outward force applied by the middle section against the body vessel.

* * * * *